United States Patent [19]

Lefnaer

[11] 4,393,818
[45] Jul. 19, 1983

[54] COAL DUST COMBUSTION MOTOR

[76] Inventor: Otto Lefnaer, Brucknerstr. 68, 7000 Stuttgart 1, Fed. Rep. of Germany

[21] Appl. No.: 266,347

[22] Filed: May 22, 1981

[30] Foreign Application Priority Data

Jan. 22, 1981 [DE] Fed. Rep. of Germany ....... 3101910

[51] Int. Cl.³ .................................................. F02B 45/02
[52] U.S. Cl. ..................................................... 123/23
[58] Field of Search ............. 123/23, 24 R, 655, 47 E; 60/39.46 S

[56] References Cited

U.S. PATENT DOCUMENTS

| | | | |
|---|---|---|---|
| 588,509 | 8/1897 | Trewhella | 123/23 |
| 2,224,229 | 12/1940 | Miller | 123/655 |
| 2,396,524 | 3/1946 | Nettel | 123/23 |
| 4,086,883 | 5/1978 | Steiger | 123/23 |
| 4,180,020 | 12/1979 | Reddy | 123/478 |
| 4,240,379 | 12/1980 | Armbruster | 123/23 |

FOREIGN PATENT DOCUMENTS

719279 4/1942 Fed. Rep. of Germany .

Primary Examiner—William A. Cuchlinski, Jr.
Attorney, Agent, or Firm—Michael J. Striker

[57] ABSTRACT

A coal dust combustion motor comprises a piston reciprocatable in a cylinder and connected at one end by a connecting rod to a crankshaft of the motor for rotating the crankshaft during reciprocation of the piston along a sucton and a compression stroke. A cylinder space is defined between the other end of the piston and a facing end wall of the cylinder. A whirling chamber communicates in the region of the cylinder end wall with the cylinder space and a mixture of coal dust and air is blown at a pressure of about 5-7 bar into the whirling chamber during the compression stroke of the piston at a time at which the pressure in the cylinder space is greater than that in the whirling chamber to prevent penetration of coal dust into the cylinder.

28 Claims, 5 Drawing Figures

COAL DUST COMBUSTION MOTOR

BACKGROUND OF THE INVENTION

The present invention relates to a coal dust combustion motor with a piston reciprocatable in a cylinder and with a whirling or precombustion chamber communicating with one end of the cylinder, into which a mixture of air and coal dust can be blown under pressure.

Coal dust combustion motors are known in the art in which during the suction stroke of the piston in the cylinder coal dust is sucked due to underpressure in the cylinder space above the piston, controlled by a suitable valve, into a precombustion chamber communicating with the main combustion space. This coal dust should then in these known motors during the following compressing stroke, before it passes into the main combustion space, first be pressed back into the precombustion chamber to be, after reaching the precombustion chamber, combusted and, due to the thereby resulting pressure increase, be blown already burning into the main combustion space. All motors constructed according to this system require for their function thermically unfavorable bottle-shaped precombustion chambers which nevertheless could not prevent penetration of coal dust into the cylinder space before the coal dust was ignited. This resulted in an undesirable increase of wear, since the coal dust which penetrated before its combustion into the main combustion space penetrated between the outer periphery of the piston and the inner periphery of the cylinder. Furthermore, partly combusted dust particles passed from the precombustion chamber coked onto the oil wetted peripheral surface of the cylinder together with ash particles which led to a further abrasive wear. In addition, in these known coal dust combustion motors, it was impossible to influence the moment of combustion in accordance with the respective loading of the motor and the resulting state of heating thereof, and it was also impossible to obtain an elastic regulation of the motor speed and its output. These precombustion motors were connected for stationary operation with considerable disadvantage and for operation in vehicles totally unusable.

A coal dust combustion motor is further known in which the coal dust is blown into the cylinder space at a high pressure of about 70 bar. The therefor necessary expenditure is considerable and results in a higher motor weight, so that such motors may be used in ships or stationary power installations, but they are unsuitable for use in vehicles.

Advantageous is, however, the blowing of the coal dust air mixture into a precombustion or whirling chamber constantly communicating with the cylinder space at a moment during the compression stroke of the piston but before the desired moment of ignition when a gas stream is present leading from the cylinder to the combustion space through which an accumulation of dirt particles on the cylinder wall already before start of the ignition during a larger part of the compression stroke is positively prevented.

SUMMARY OF THE INVENTION

It is an object of the present invention to provide a coal dust combustion motor which avoids the disadvantages of such motors known in the art, which do not require a high pressure compressor so that the motor may be constructed with the least possible weight.

It is a further object of the present invention to provide a coal dust combustion motor permitting an elastic operation with regard to speed and load.

It is an additional object of the present invention to provide a coal dust combustion motor in which the wear is considerably reduced, as compared with such motors known in the art.

With these and other objects in view, which will become apparent as the description proceeds, the coal dust combustion motor according to the present invention mainly comprises a cylinder, a piston reciprocable in the cylinder between a suction stroke and a compression stroke and defining between one end of said piston and a facing end wall of the cylinder a space, a whirling chamber communicating with the space in the region of said facing end wall of said cylinder, means for blowing a mixture of air and coal dust at a lower pressure of about 5-7 atm into the whirling chamber during the compression stroke of said piston at a time in which the pressure in said space is greater than the effective pressure in said whirling chamber.

Since the mixture of air and coal dust is at a low pressure blown into the whirling chamber, the use of expensive air compression devices for high pressures is avoided, while due to the different moments of blowing of coal dust in the already heated combustion air a corresponding control of the ignition moment necessary for an elastic operation of the motor is assured by a corresponding more or less increased preheating of the coal dust particles.

The motor further comprises a driven shaft and a crank means connecting the other end of the piston to the shaft for turning the latter during reciprocation of the piston and the blowing of air and coal dust into the whirling chamber is preferably made at a moment in which the crank means passes through an angle between 110° and 70° ahead of its upper dead center position. These angles may be varied for about 10° depending on the number of revolutions and the changing load of the motor. It is also advantageous if the start of blowing in and/or the end of the blowing in is regulated by means of an electronic regulating device so that an elastic operation of the motor can be obtained necessary for the use of the coal dust motor according to the present invention in vehicles. Advantageous is further that the amount of air and coal dust blown in per time unit, as well as the duration of blowing in, is regulatable, for instance by a corresponding control of the blowing-in valve by means of an electronic device or by means of a cam curve.

An advantageous ratio of weight to output can be obtained when the coal dust combustion motor is operated with a two-stroke cycle, whereby advantageously the combustion air is fed into the cylinder space over slots in the peripheral wall of the cylinder. The motor according to the present invention can, however, also operate with a four-stroke cycle, whereby combustion air at low pressure may be supplied by means of a rotating or preferably a single-stage compressor.

Dirt deposition in the cylinder space above the piston is during two-stroke cycle operation advantageously reduced by the provision of a central outlet valve which is provided at the axis of the piston in an end wall of the cylinder facing one end of the piston; thereby a continuous scavenging is obtained in connection with the inlet slots which will provide a good cleaning and cooling action since the stream of the combustion gases will lead away from the peripheral wall of the cylinder to the center of the cylinder head. This advantage is also maintained by scavenging the cylinder space by a crankcase scavenging, as known for motors operated on a two-stroke cycle.

A good whirling and combustion of the coal dust can be obtained in that the whirling chamber as connected with the cylinder space by a connecting channel which extends substantially radially along the end wall of the cylinder. However, different arrangements of the connecting channel are possible, for instance a connecting channel which extends centrally parallel to the direction of movement of the piston through the end wall of the cylinder.

Especially for facilitating starting of the motor and for a sure partial-load operation of the motor, the connecting channel and/or the wall of the whirling chamber may at least partially be heated by a heat source, for instance in the form of a glow plug or a flame.

An especially weight-saving construction of the motor is obtained if the piston thereof is formed as a stepped piston so that the thus formed annular space may be used to compress the air for the blowing in of the coal dust or the coal dust air mixture. In this construction no further compression devices are necessary. The passage of air from the annular space into the whirling chamber is preferably controlled by spring-loaded one-way valves.

The pressure of the compressed air for the blowing in of the coal dust is preferably maintained substantially constant by means of a pressure-equalizing container. The pressure in this pressure-equalizing container and/or the pressure for the injection valve is regulatable and/or maintainable at a constant pressure by a pressure regulator. This pressure may be regulated in dependence on the number of revolutions and/or the load applied to the motor, in order to obtain an elastic operation of the same.

A reduction of wear on the piston track can be obtained in that lateral forces acting on the piston are held as small as possible. This can especially be obtained by providing an elongated stepped piston and in which the large-diameter piston portion is connected by a cross head pin with the connecting rod. Any occurring transverse forces are then absorbed by the large-diameter portion of the stepped piston which is subjected to less wear and at which hardly any soiling of the cylinder wall occurs. In order to prevent penetration of dirty oil into the compression space for the blowing-in air, an annular channel for the discharge of such dirty oil may be provided in the region where the inner diameter of the cylinder changes from a large to a small diameter. This dirty oil is preferably collected in a dirty oil separator and discharged from the latter. The leading away of dirt particles can further be improved in that the mentioned annular channel is at the same time used for the discharge of the compressed scavenging air or part of the latter, so that penetrating dirt particles or oil residues are carried away by this scavenging air and separated therefrom by means of known devices. A further essential reduction of wear of the cylinder wall can be obtained when the piston has at an end portion bordering the cylinder space a diameter smaller than the small-diameter portion of the cylinder to form with the latter an annular gap. This annular gap is advantageously provided with fresh air to form a fresh-air buffer which holds dirt particles away from the cylinder wall and the piston ring This annular gap is connected in the lower dead center position of the piston by passages with a pressure accumulator for fresh air. This pressure accumulator may be formed by an annular space arranged between the piston and the cylinder wall, which is connected over a one-way valve with the compression space of the stepped piston.

The volume of the annular compression space, when the piston is in the lower dead center position is about 30% of the volume of the cylinder space in the lower dead center position of the piston.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
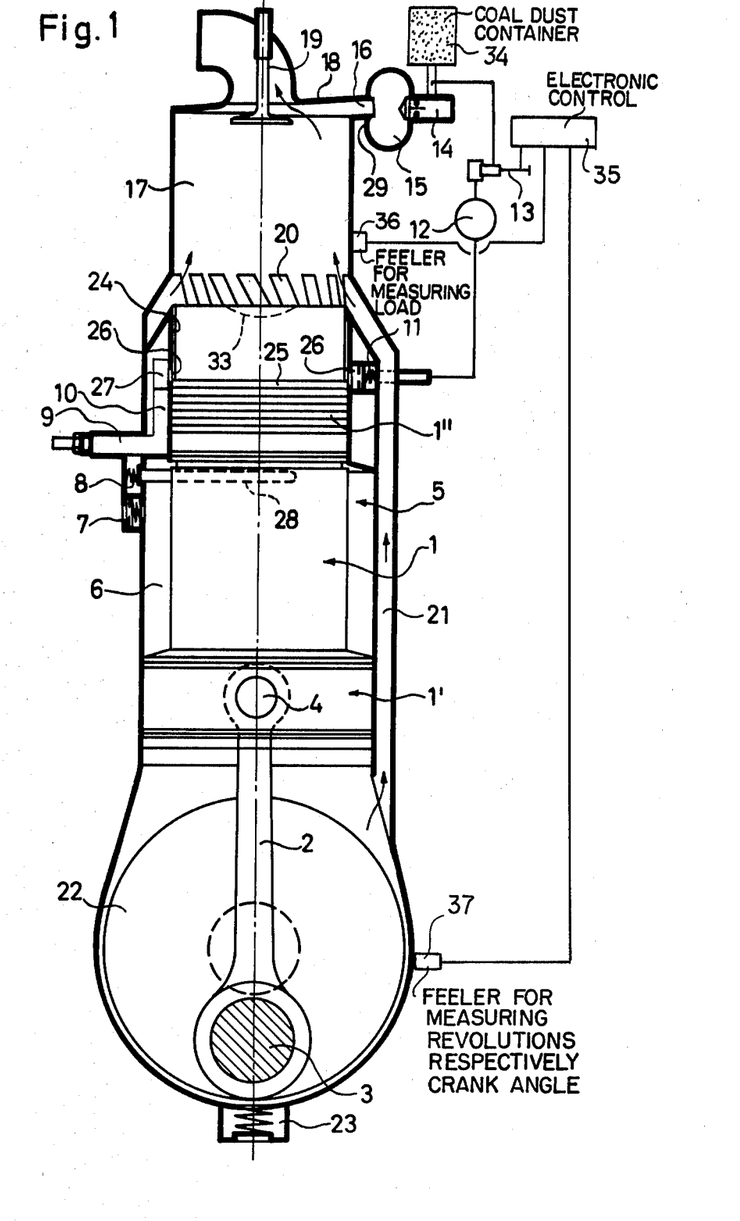
FIG. 1 is a schematic longitudinal cross section of a first embodiment of the coal dust combustion motor according to the present invention.

Referring now to the drawing, and more specifically to FIG. 1 of the same, it will be seen that the coal dust combustion motor illustrated therein comprises a two-step piston 1 which is connected at one end thereof by means of a connecting rod 2 with a crank shaft 3. The connecting rod 2 is connected by means of a bolt 4 substantially to the center of the large-diameter portion 1' of the stepped piston 1. The large-diameter portion 1' of the stepped piston and the small-diameter portion 1" thereof are guided in a correspondingly stepped cylinder 5. An annular compression space 6 is thus formed between the stepped cylinder 5 and the stepped piston 1, so that during the suction stroke of the piston air will be sucked, over at least one spring-loaded one-way valve 7, into the space 6 and compressed air will be discharged during the compression stroke of the piston 1 over at least one spring-loaded one-way valve 8, over an oil separator 9, a discharge channel 10 and a further spring-loaded one-way valve 11 into a pressure-equalizing container 12.

The pressure-equalizing container 12 is over a pressure regulator 13 connected to a passage leading from a coal dust container 34 to an injection valve 14 so that a mixture of air and coal dust may be blown into a pre-combustion or whirling chamber 15. The whirling chamber 15 is continuously connected by a connecting channel 16 of reduced cross section with the main combustion space 17 formed at the upper end of the cylinder between the end wall 18 of the latter and the facing end of the stepped piston 1. In the embodiment illustrated in FIG. 1, the connecting channel 16 communicates in radial direction with the aforementioned cylinder space 17 adjacent the end wall 18 of the latter, whereby the piston 1 and/or the cylinder head is provided with a recess 33 in the direction of the connecting channel 16. This recess preferably has opposite ends spaced from the peripheral wall of the cylinder. An outlet valve 19 is arranged substantially in the center of the end wall 18 of the cylinder.

The piston 1 is illustrated in FIG. 1 in its lower dead center position. In this position a plurality of slots 20 arranged at the circumference of the cylinder 5 are unblocked, which are connected by a connecting channel 21 with the crankcase 22 of the motor. During the compression stroke of the piston 1, fresh air is sucked over a one-way valve 23 into the crankcase, and this air passes then during the suction stroke of the piston 1 from the crankcase 22 through the connecting channel 21 and the slots 20 into the space 17 to the outlet valve 19.

The piston portion 1" has at an end portion thereof bordering the space 17 a diameter slightly smaller than the small-diameter portion of the cylinder 5, so that an annular gap 24 is formed between this end portion of the piston and the inner peripheral surface of the cylinder 5. The small-diameter portion of the cylinder is provided with a plurality of openings 26 which, in the illustrated lower dead center position, provide communication between the annular gap 24 and the annular space 27 above the first piston ring 25 provided on the small-diameter portion 1" of the piston. The annular space 27, in turn, communicates with the aforementioned discharge channel 10. In the lower dead center position of the piston, fresh air under pressure can thus penetrate through the openings 26 into the annular gap 24. This fresh air forms an air accumulator, so that penetration of dirt particles into the annular gap 24 is essentially avoided. Any dirt managing to penetrate into the gap 24 will be blown away by the fresh air passing through this gap, which at the same time will also provide a cooling of the piston 1 and the cylinder 5. Since the whole air stream starts from the inner surface of the peripheral wall of the cylinder 5, a deposition of dirt, coal dust and combustion elements on the inner surface of the cylinder wall is maintained at a minimum, whereby the wear is reduced.

Since a dirtying of the oil lubricating the piston portion 1" cannot be entirely avoided, this dirty oil emanating from the lower end of the piston portion 1" is collected in a collecting channel or collecting groove 28 and discharged from the latter during the compression stroke of the piston over a spring-loaded valve 8 into an oil separator 9.

Figure 4:
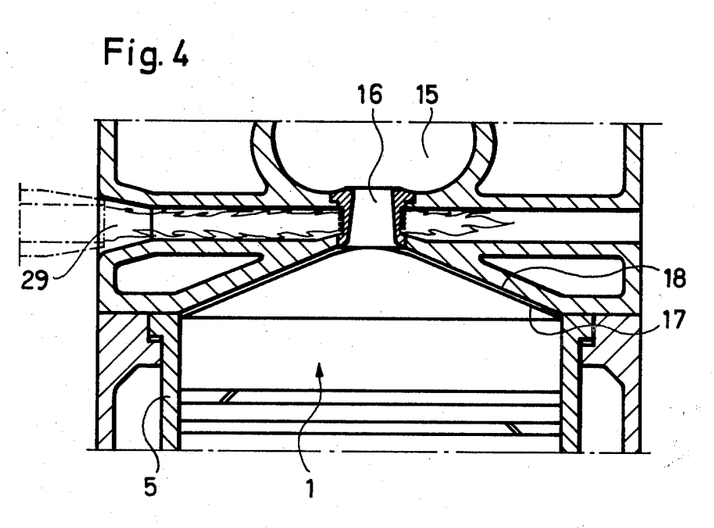
FIG. 4 is a partial cross section through part of a whirling chamber and the upper cylinder space for a modified construction of a coal dust combustion motor.

Especially to facilitate starting of the motor, the connecting channel 16 may be heated by a heat source 29, for instance in form of a flame as illustrated in FIG. 4, so that the connecting channel 16 and also the air and coal dust mixture in the whirling chamber 15 will be heated so that the motor according to the present invention will start quickly.

Figure 2:
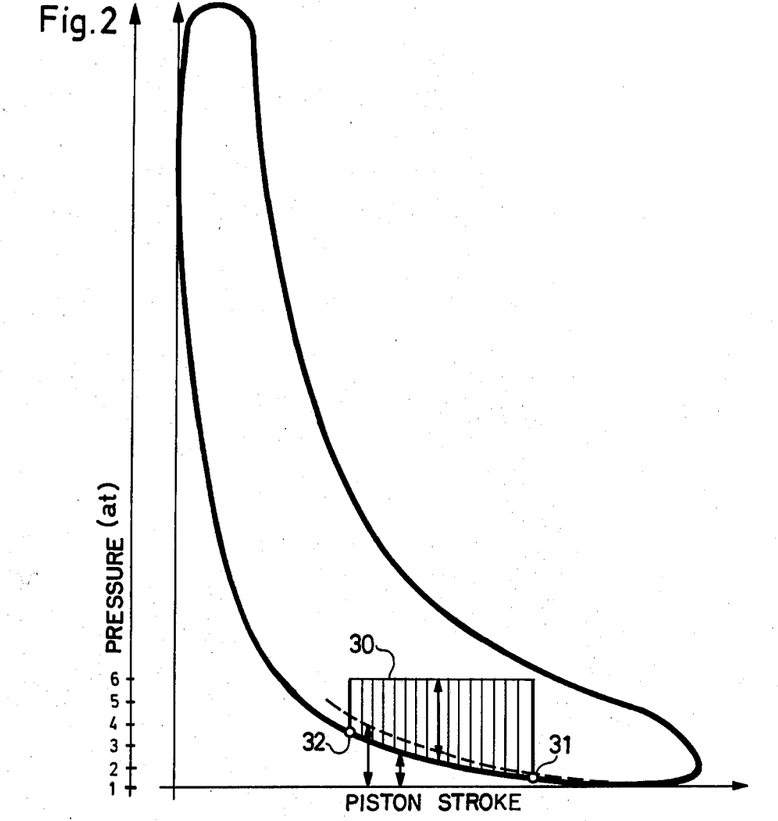
FIG. 2 is a pressure diagram.
Figure 3:
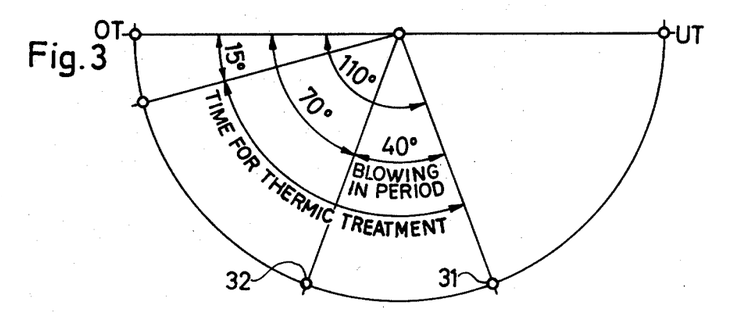
FIG. 3 is a diagram illustrating the crank angles for the various pressures illustrated in FIG. 2.

The volume of the annular compression space 6 and that of the pressure-equalizing container 12 are dimensioned in such a manner that during operation of the motor a pressure of 5-7 bar is maintained in the pressure-equalizing container 12. As illustrated in the diagrams of FIGS. 2 and 3, the blowing in of a mixture of air and coal dust into the whirling chamber 15 occurs after the slots 20 are covered, preferably at a crank angle between about 110° and 70° before the upper dead center position of the crankshaft. The duration of the blowing-in period extends therefore over a crankshaft angle of about 40°, whereby the start and the end of the blowing-in period may deviate to a greater or lesser extent from the desired ignition moment in dependence on the number of revolutions and the load applied to the motor. The control of the start and end of the blowing-in period may be accomplished by electronic control 35 of known construction connected to the pressure regulator 13 in combination with two feelers 36 and 37 connected in circuit with the electronic control 35 for respectively measuring the load applied to the motor and for measuring the revolutions of the crankshaft 3 respectively the crank angle of the latter. During the compression stroke of the piston 1, the pressure in the cylinder space 17 increases and the pressure in the whirling chamber 15 likewise increases due to the blowing of a mixture of compressed air and coal dust into the latter. The amount of air and coal dust blown into the whirling chamber 15 and the volume of the latter are dimensioned in such a manner that the pressure in the cylinder space 17 is always slightly greater than the effective pressure in the whirling chamber 15. This will assure that always part of the compressed air will stream during the blowing-in period from the cylinder space 17 in the whirling chamber 15. This will positively prevent penetration of coal dust into the cylinder space 17, so that during the main compression time no wear-producing impurities may penetrate into the space 17. During the compression the temperature of the compressed gas will increase. Thereby the coal dust blown into the whirling chamber 15 will be heated, and shortly before the crankshaft 3 reaches its upper dead center position, that is at about an angle of 15° before the upper dead center position, the ignition of the mixture of air and coal dust in the whirling chamber 15 will occur. The combustion of the air-coal dust mixture in the whirling chamber 15 will result in a sudden pressure increase in the latter, and during the further combustion an expansion of the mixture into the space 17 will occur and during further combustion an expansion of this mixture into the cylinder space 17 will result with further combustion and whirling of this mixture.

The pressure conditions during a working cycle of the motor are illustrated in FIG. 2. The line 30 illustrates the pressure provided in the injection valve 14 and the point 31 indicates the start and point 32 the end of the blowing of a mixture of air and coal dust into the injection valve 14. The full line curve indicates the pressure in the whirling chamber 15, whereas the dash line indicates the higher pressure in the cylinder space 17.

Figure 5:
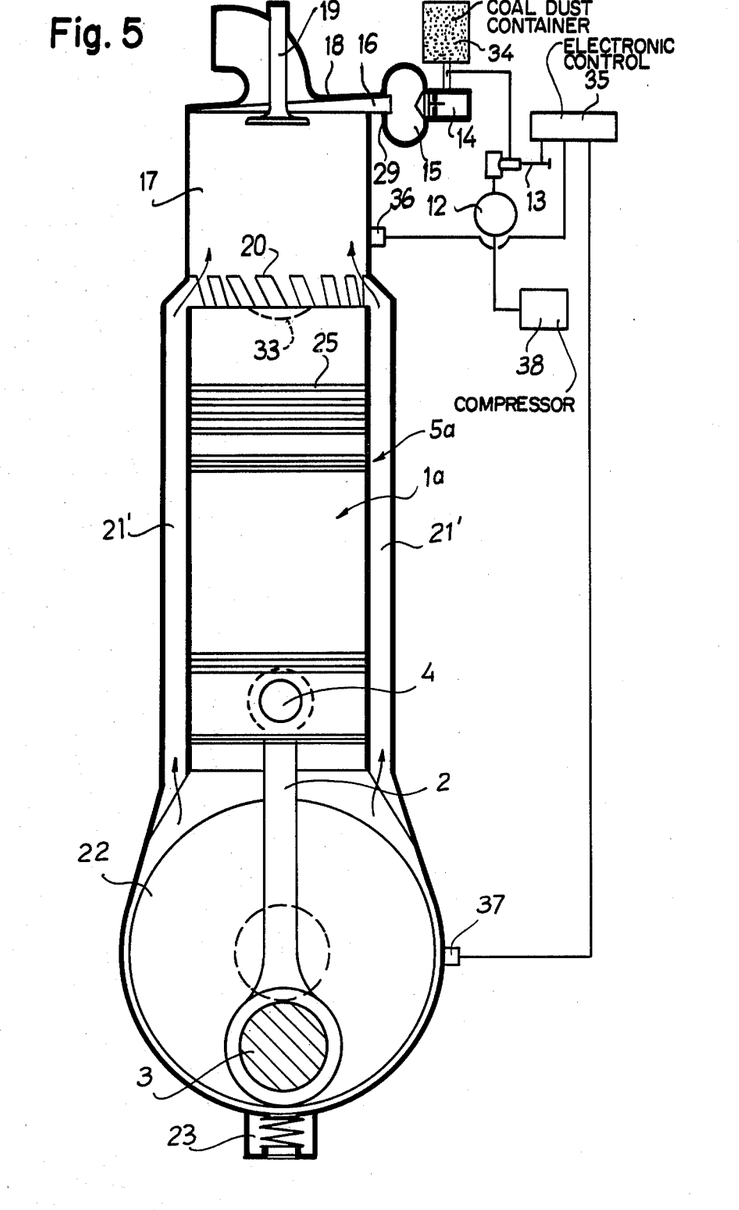
FIG. 5 is a schematic longitudinal cross section through a further modification of a coal dust combustion motor according to the present invention.

The embodiment shown in FIG. 5 differs from that as described in connection with FIG. 1, in that the piston 1a of this embodiment is not a stepped piston but an elongated piston of uniform diameter, and correspondingly the cylinder 5a of this embodiment has a uniform inner diameter throughout its length. Scavenging air is in this case fed into the space 17 during reciprocation of the piston through an annular channel 21' providing communication between the crankcase 22 and the slots 22 at the lower end of the cylinder space 17, whereby this scavenging air is sucked into the crankcase through the inlet valve 23 and subsequently discharged from the space 17 through the outlet valve 19. The necessary compressed air for feeding mixture of coal dust and air into the injection valve 14 is in this embodiment provided by a compressor, preferably a single-stage piston compressor 38 which may be continuously operated, and which communicates with the pressure-equalizing containing 12. The compressed air passes from the pressure-equalizing container 12 over a pressure regulator 13 into a passage leading from a coal dust container 34 into the injection valve 14 in the same manner as described in connection with FIG. 1. An electronic control 35 is again connected to the pressure regulator 13 to control in conjunction with the feelers 36 and 37 the beginning and the end of the blowing-in period in the manner as described in connection with FIG. 1.

It will be understood that each of the elements described above, or two or more together, may also find a useful application in other types of coal dust combustion motors differing from the types described above.

While the invention has been illustrated and described as embodied in a coal dust combustion motor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A coal dust combustion motor comprising a cylinder; a piston reciprocatable in said cylinder between a suction stroke and a compression stroke and defining between one end of said piston and a facing end wall of said cylinder a main combination space; a whirling chamber continuously communicating with said space in the region of said end wall of said cylinder; means for blowing a mixture of air and coal dust at a low pressure of about 5–7 atm into said whirling chamber during the compression stroke of said piston at a time at which the pressure in said space is greater than the effective pressure in said whirling chamber.

2. A coal dust combustion motor as defined in claim 1, and further comprising a crankshaft and a connecting rod connecting the other end of said piston to said crankshaft for turning the latter during reciprocation of said piston, and including means for regulating the blowing in of air and coal dust into said whirling chamber such that the blowing in occurs during the time in which the crank of the crankshaft passes through an angle between 110° and 70° ahead of the upper dead center position of the crankshaft.

3. A coal dust combustion motor as defined in claim 2, wherein said regulating means for the blowing-in period comprises electronic regulating means which regulate the duration of the blowing-in period depending on the number of revolutions per time unit and the load applied to the motor.

4. A coal dust combustion motor as defined in claim 3, wherein said electronic regulating means are constructed for regulating also the amount of coal dust-air mixture blown into said space per time unit during the blowing-in period.

5. A coal dust combustion motor as defined in claim 1, and including means for feeding combustion air into said space while the crankshaft moves from its lower dead center position to a crank angle of about 50°.

6. A coal dust combustion motor as defined in claim 5, and including an outlet valve in said end wall of said cylinder substantially coaxial with a longitudinal axis of said piston.

7. A coal dust combustion motor as defined in claim 5, wherein said cylinder has opposite said end wall an open end and including a crankcase connected to and communicating with said open end of said cylinder, wherein said means for feeding combustion air into said cylinder space comprises a plurality of slots communicating with said cylinder space in a region spaced from said end wall and at least one channel providing communication between said slots and said crankcase.

8. A coal dust combustion motor as defined in claim 1, wherein said whirling chamber communicates with said cylinder space through a connecting channel.

9. A coal dust combustion motor as defined in claim 8, wherein said connecting channel extends in substantially radial direction along said end wall of said cylinder.

10. A coal dust combustion motor as defined in claim 9, wherein said piston has an end wall facing said end wall of said cylinder, one of said end walls being provided with a recess extending in the direction of said connecting channel.

11. A coal dust combustion motor as defined in claim 8, and including heating means for heating at least said connecting channel.

12. A coal dust combustion motor as defined in claim 11, wherein said heating means are arranged to heat also a portion of a wall defining said whirling chamber which is adjacent said connecting channel.

13. A coal dust combustion motor as defined in claim 1, wherein said piston is a stepped piston having at the other end thereof a large-diameter portion and having a small-diameter portion of considerably greater axial length than said large-diameter portion and projecting from the latter towards said end wall of said cylinder, and wherein said cylinder has a portion of large diameter corresponding to the diameter of said large-diameter portion of said piston of an axial length greater than that of said large-diameter portion of said piston and a small-diameter portion corresponding to the diameter of said small-diameter portion of said piston and extending from said large-diameter portion of said cylinder to said end wall thereof to define between part of said large-diameter portion of said cylinder and part of said small-diameter portion of said piston an annular compression space in which air is compressed during the compression stroke of said piston for blowing a mixture of compressed air and coal dust into said whirling chamber.

14. A coal dust combustion motor as defined in claim 13, and including a pair of spring-loaded one-way valves for controlling inlet and outlet of air into and from said annular compression space.

15. A coal dust combustion motor as defined in claim 13, and including a crankshaft, a connecting rod pivotally connected at one end to said crankshaft, and a bolt pivotally connecting the other end of the connecting rod to a central region of said large-diameter portion of said piston.

16. A coal dust combustion motor as defined in claim 13, wherein said piston has at an end bordering said cylinder space a diameter smaller than said small-diameter portion of said cylinder to form with the latter an annular gap.

17. A coal dust combustion motor as defined in claim 13, wherein the volume of said annular compression space, when said piston is in the lower dead center position, is about 30% of the volume of said cylinder space in said lower dead center position of said piston.

18. A coal dust combustion motor as defined in claim 1, wherein said means for blowing air and coal dust into said whirling chamber comprises a separate compressor for the blowing air.

19. A coal dust combustion motor comprising a cylinder; a piston reciprocatable in said cylinder between a suction stroke and a compression stroke and defining between one end of said piston and a facing end wall of said cylinder a space; a whirling chamber communicating with said space in the region of said end wall of said cylinder; means for blowing a mixture of air and coal dust at a low pressure of about 5–7 atm into said whirling chamber during the compression stroke of said piston at a time at which the pressure in said space is greater than the effective pressure in said whirling chamber; said whirling chamber communicating with said cylinder space through a connecting channel; and wherein said whirling chamber is arranged on that side of said end wall which faces away from said one end of said piston, and wherein said connecting channels extends through said end wall.

20. A coal dust combustion motor comprising a cylinder; a piston reciprocatable in said cylinder between a suction stroke and a compression stroke and defining between one end of said piston and a facing end wall of said cylinder a space; a whirling chamber communicating with said space in the region of said end wall of said cylinder; means for blowing a mixture of air and coal dust at a low pressure of about 5–7 atm into said whirling chamber during the compression stroke of said piston at a time at which the pressure in said space is greater than the effective pressure in said whirling chamber; said piston being a stepped piston having at the other end thereof a large-diameter portion and having a small-diameter portion of considerably greater axial length than said large-diameter portion and projecting from the latter towards said end wall of said cylinder, said cylinder having a portion of large diameter corresponding to the diameter of said large-diameter portion of said piston of an axial length greater than that of said large-diameter portion of said piston and a small-diameter portion corresponding to the diameter of said small-diameter portion of said piston and extending from said large-diameter portion of said cylinder to said end wall thereof to define between part of said large-diameter portion of said cylinder and part of said small-diameter portion of said piston an annular compression space in which air is compressed during the compression stroke of said piston for blowing a mixture of compressed air and coal dust into said whirling chamber; and wherein said means for blowing a mixture of air and coal dust into said whirling chamber comprises an injection valve communicating with said whirling chamber, and wherein said annular compression space communicates with said injection valve over a pressure-equalizing container.

21. A coal dust combustion motor as defined in claim 20, and including a pressure regulator arranged between said pressure-equalizing container and said injection valve.

22. A coal dust combustion motor as defined in claim 21, and including electronic regulating means connected to said pressure regulating valve for regulating the pressure of the compressed air supplied to said means for blowing a mixture of air and coal dust into said whirling chamber in dependence on the revolutions per time unit performed by the motor and the load applied to the latter.

23. A coal dust combustion motor as defined in claim 20, wherein said means for blowing a mixture of air and coal dust into said whirling chamber comprises a coal dust container communicating with said injection valve.

24. A coal dust combustion motor comprising a cylinder; a piston reciprocatable in said cylinder between a suction stroke and a compression stroke and defining between one end of said piston and a facing end wall of said cylinder a space; a whirling chamber communicating with said space in the region of said end wall of said cylinder; means for blowing a mixture of air and coal dust at a low pressure of about 5–7 atm into said whirling chamber during the compression stroke of said piston at a time at which the pressure in said space is greater than the effective pressure in said whirling chamber; said piston being a stepped piston having at the other end thereof a large-diameter portion and having a small-diameter portion of considerably greater axial length than said large-diameter portion and projecting from the latter towards said end wall of said cylinder, said cylinder having a portion of large diameter corresponding to the diameter of said large-diameter portion of said piston of an axial length greater than that of said large-diameter portion of said piston and a small-diameter portion of said piston and extending from said large-diameter portion of said cylinder to said end wall thereof to define between part of said large-diameter portion of said cylinder and part of said small-diameter portion of said piston an annular compression space in which air is compressed during the compression stroke of said piston for blowing a mixture of compressed air and coal dust into said whirling chamber; and including a collecting groove extending at least partly along the inner surface of the peripheral wall of said cylinder in the region at which said large-diameter portion of said cylinder joins the small-diameter portion thereof for discharge of dirty lubricating oil from said cylinder.

25. A coal dust combustion motor as defined in claim 24, wherein said collecting groove serves also for the discharge of compressed air from said annular compression space.

26. A coal dust combustion motor as defined in claim 25, wherein said annular compression space communicates with said whirling chamber through a discharge channel and including an oil separator in said discharge channel.

27. A coal dust combustion motor comprising a cylinder; a piston reciprocatable in said cylinder between a suction stroke and a compression stroke and defining between one end of said piston and a facing end wall of said cylinder a space; a whirling chamber communicating with said space in the region of said end wall of said cylinder; means for blowing a mixture of air and coal dust at a low pressure of about 5–7 atm into said whirling chamber during the compression stroke of said piston at a time at which the pressure in said space is greater than the effective pressure in said whirling chamber; said piston being a stepped piston having at the other end thereof a large-diameter portion and having a small-diameter portion of considerably greater axial length than said large-diameter portion and projecting from the latter towards said end wall of said cylinder, said cylinder having a portion of large diameter corresponding to the diameter of said large-diameter portion of said piston of an axial length greater than that of said large-diameter portion of said piston and a small-diameter portion corresponding to the diameter of said small-diameter portion of said piston and extending from said large-diameter portion of said cylinder to said end wall thereof to define between part of said large-diameter portion of said cylinder and part of said small-diameter portion of said piston an annular compression space in which air is compressed during the compression stroke of said piston for blowing a mixture of compressed air and coal dust into said whirling chamber; said piston having at an end bordering said cylinder space a diameter smaller than said small-diameter portion of said cylinder to form with the latter an annular gap; and including passage means providing in the lower dead center position of said piston communication between said annular compression space and said annular gap.

28. A coal dust combustion motor as defined in claim 27, and including a one-way valve in said passage means permitting flow of compressed air from said annular compression space into said annular gap while preventing flow of air from said annular gap into said annular compression space.

* * * * *